Patented Dec. 9, 1930

1,784,509

UNITED STATES PATENT OFFICE

WALTER S. BAYLIS, OF LOS ANGELES, CALIFORNIA, ASSIGNOR TO FILTROL COMPANY OF CALIFORNIA, OF LOS ANGELES, CALIFORNIA, A CORPORATION OF CALIFORNIA

FILTERING AND DECOLORIZING PAPER OF ACID CHARACTER

No Drawing. Original application filed April 24, 1928, Serial No. 272,572. Divided and this application filed August 5, 1929. Serial No. 383,657.

This invention relates to a filtering or so-called "blotting" paper capable of filtering oils, gasolines, or other liquids and decolorizing them in one operation. This application is a division of my copending case, Serial No. 272,572, filed April 24, 1928.

More particularly the invention relates to a paper which contains a proportion of an acid-activated clay which in turn contains a small proportion of free acid.

The object of my invention is to provide a rapidly-filtering paper of extraordinary decolorizing efficiency, which will itself provide the acid condition under which the decolorizing operation is performed at maximum efficiency.

In order to provide such a paper, I incorporate into the blotting or filtering paper at the time of its manufacture, from 10% to 25% of the finished weight of the paper of an acid-activated clay which contains a small amount of free acid. I prefer to use a special kind of recolorizing clay which is known as "Filtrol," which is an acid-activated clay of the bentonite or smectite type. It is made by a process somewhat similar to that described by P. W. Prutzman in his U. S. Patent No. 1,397,113, issued November 15, 1921. A special kind of "Filtrol" which I prefer to use is incompletely neutralized in the manufacture so that it contains uniformly distributed in it from 0.15% to 0.50% of free sulphuric acid. This acid is held in a more or less adsorbed or absorbed condition so that it is not readily washed out with water. This property makes it possible to use the acid clay in paper or add it to paper pulp with the assurance that most of the acidity of the clay will be retained in the finished paper, yet will have little or no tendency to deteriorate the paper on storage.

In the preferred practice of my invention I add "Filtrol" or other acid-activated clay of acid nature equal to 25% of the weight of the finished paper to the paper pulp. The Filtrol contains about 0.30% of sulphuric acid and will give in the paper an acidity of the clay of about 0.25%.

In making the paper, an extra close filtering blanket should be used on the paper machine to prevent filtering through of the clay, the amount of vacuum should be reduced and the machine run at a slower speed than usual.

In using the paper, it is preferably held in the conventional filter press in place of the usual cloth; it may however be used with the cloth before or behind it to confer additional strength. Alternate sheets of paper containing clay, and paper containing no clay may be used, so that any clay washed from the clay-containing sheets during filtration will be caught upon the sheets which contain no clay.

I claim as my invention:

1. A filtering paper containing an acid-activated clay which contains free acid.

2. A filtering paper containing an acid-activated clay which contains free sulphuric acid.

3. A filtering paper according to claim 2 in which the proportion of free acid in the clay ranges from 0.10% to 0.50% by weight.

4. A filtering paper containing from 10% to 25% of its weight of acid-activated clay in which there is a small content of free acid.

5. A paper according to claim 4, in which the acid is sulphuric acid.

6. A paper according to claim 4, in which the clay is "Filtrol."

7. A paper according to claim 4, in which the free acid content lies between 0.10% and 0.50% by weight of the clay.

8. A paper capable of simultaneous filtering and recolorization of oils which contains from 10% to 25% of its own weight of an acid-activated clay of the bentonite or smectite type, said clay being an efficient recolorizer of oils and containing from 0.10% to 0.50% of free sulphuric acid.

In testimony whereof, I have hereunto set my hand at New York, New York, this 25th day of July, 1929.

WALTER S. BAYLIS.

CERTIFICATE OF CORRECTION.

Patent No. 1,784,509. Granted December 9, 1930, to

WALTER S. BAYLIS.

It is hereby certified that error appears in the printed specification of the above numbered patent requiring correction as follows: Page 1, line 23, for the word "recolorizing" read decolorizing; line 85, claim 8, for "recolorization" read decolorization, and lines 88 and 89, for "recolorizer" read decolorizer; and that the said Letters Patent should be read with these corrections therein that the same may conform to the record of the case in the Patent Office.

Signed and sealed this 13th day of January, A. D. 1931.

(Seal)

M. J. Moore,
Acting Commissioner of Patents.